United States Patent [19]

Saionji

[11] Patent Number: 5,534,947
[45] Date of Patent: Jul. 9, 1996

[54] ADVANCED COMB FILTER

[75] Inventor: Osamu Saionji, Ibaraki, Japan

[73] Assignee: Motorola, Inc., Schaumburg, Ill.

[21] Appl. No.: 243,360

[22] Filed: May 16, 1994

[51] Int. Cl.⁶ .................................................. H04N 9/78
[52] U.S. Cl. .......................................... 348/664; 348/665
[58] Field of Search ................................... 348/663–670; H04N 9/78

[56] References Cited

U.S. PATENT DOCUMENTS

| | | |
|---|---|---|
| 4,050,084 | 9/1977 | Rossi . |
| 4,240,105 | 12/1980 | Faroadja . |
| 4,305,091 | 12/1981 | Cooper . |
| 4,388,729 | 6/1983 | Spencer . |
| 4,533,070 | 2/1986 | Cooper . |
| 4,591,911 | 5/1986 | Tanaka ................................. 348/664 X |
| 4,803,547 | 2/1989 | Stratton . |

FOREIGN PATENT DOCUMENTS

| | | | |
|---|---|---|---|
| 60-134587 | 7/1985 | Japan . | |
| 2204209 | 11/1988 | United Kingdom | H04N 9/78 |
| 2226207 | 6/1990 | United Kingdom | H04N 9/78 |

OTHER PUBLICATIONS

"Separation of NTSC Signals by Minimum Mean Square Error filters and Adaptive Filters"; Maxemchuk and Sharma; IEEE Transactions on Communications; vol. Com–26, #5, May '78.

"Adaptive Noise Canally: Principles and Applications"; Widrow et al.; IEEE Proceedings; vol. 63 #12; Dec. '75.

*Primary Examiner*—Victor R. Kostak
*Attorney, Agent, or Firm*—Harry A. Wolin

[57] ABSTRACT

A method of determining a chrominance element for pixel signals of an optical image for a 1H delay circuit. The pixel signal(s) are first filtered through a band-pass filter to remove low frequency luminance components and a part of the filtered signal is fed through a 1H scan line delay. The result is a 0H pixel signal and a 1H pixel signal one scan line apart. The 0H pixel signal is added to the 1H pixel signal to generate a combed chrominance component, and the 0H pixel signal and the combed chrominance component are compared to see which is the greater. If the value of the 0H pixel signal is greater or equal to the combed chrominance component, the combed chrominance component is output as the chrominance element. If the value of the 0H pixel signal is less than the combed chrominance component, the 0H pixel signal is output as the chrominance element.

15 Claims, 2 Drawing Sheets

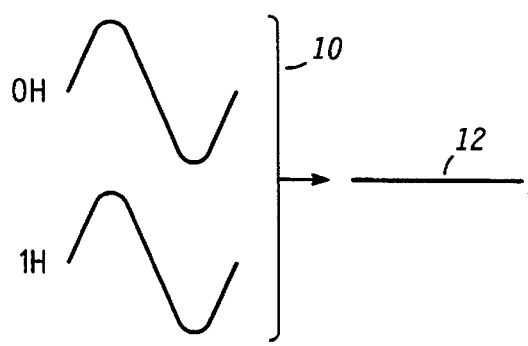
FIG. 1A
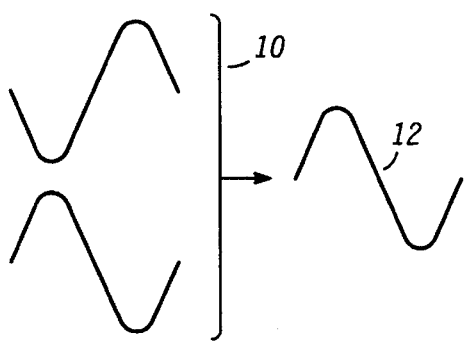
FIG. 1B
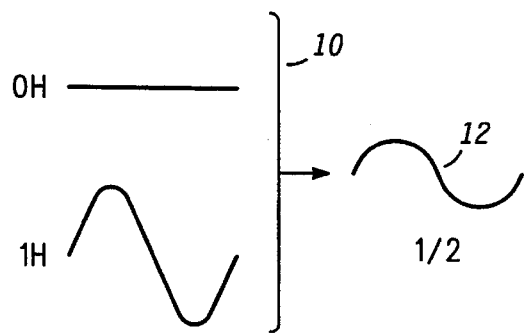
FIG. 1C
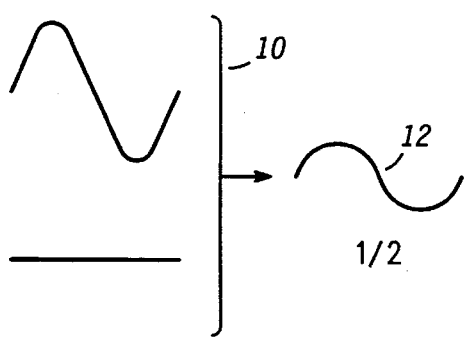
FIG. 1D
FIG. 2
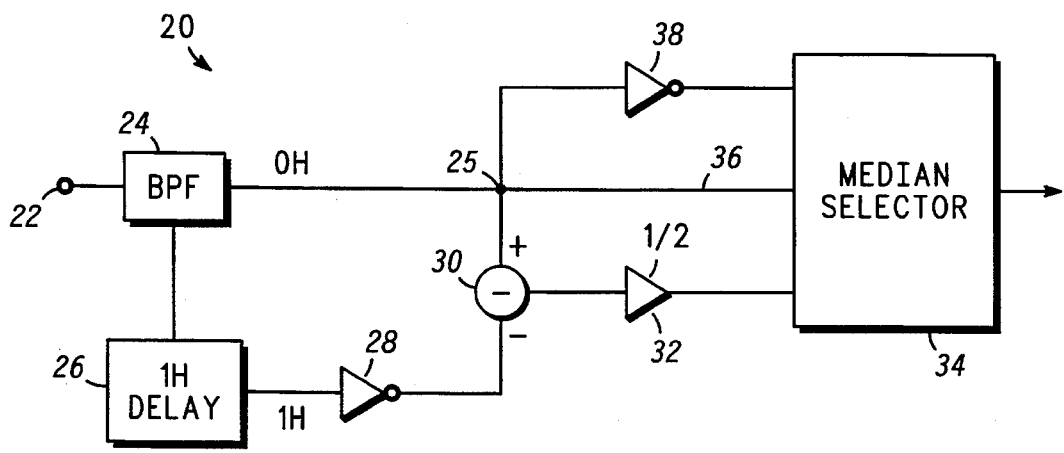

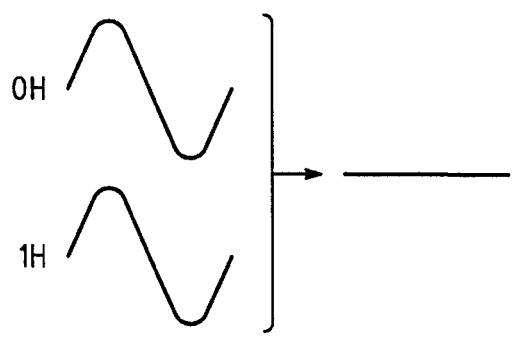
FIG. 3A
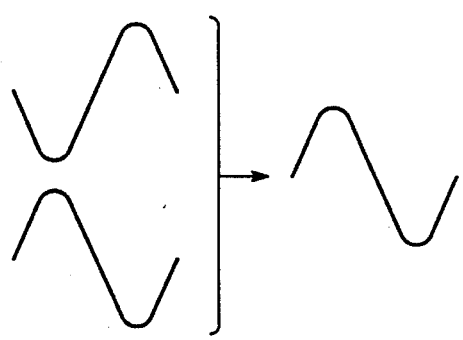
FIG. 3B
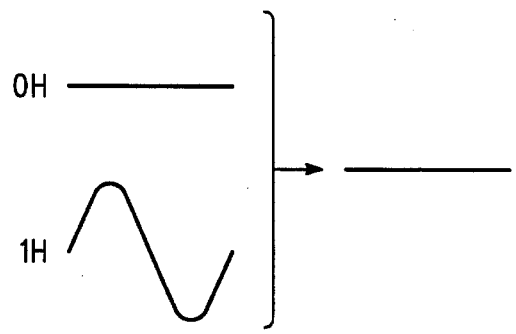
FIG. 3C
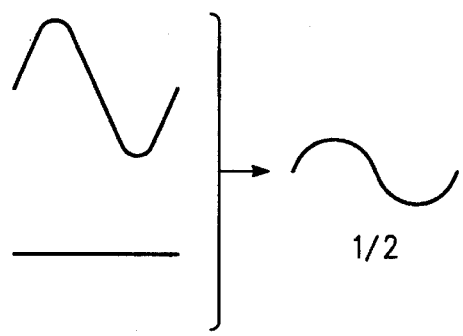
FIG. 3D
FIG. 4
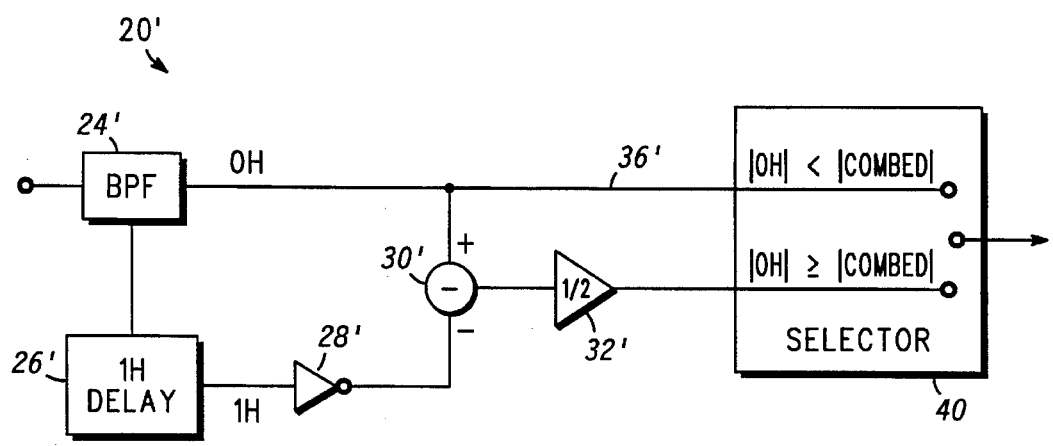

ADVANCED COMB FILTER

FIELD OF THE INVENTION

This invention relates in general to circuits for filtering incoming signals, and in particular to an advanced comb filter for separating luminance and chrominance components in a composite video signal.

BACKGROUND OF THE INVENTION

Since the early part of the 1960's, color television signals using the NTSC format have been broadcast throughout the world. This NTSC format has been the standard everywhere, and continues to be so today and on into the future. The NTSC format requires designated scan lines, bandwidths, etc., and utilizes a composite video signal having a luminance component (brightness) and a chrominance component (color).

The screen on a television is composed of hundreds of pixel elements which are activated according to the information received from the composite NTSC video signal. The color on these pixel elements is constantly changing over time as well as from pixel element to pixel element. One of the challenges to designers is how to compare the color changes occuring from pixel element to adjacent pixel elements to generate a clearer, sharper picture. The problem is further compounded as the element moves across the screen.

One important aspect of processing the composite video signal is separating the luminance component of the signal from the chrominance component. Without proper separation of the two components, problems in the display such as cross color dot crawl and color smear between pixel elements will occur.

Key to defining a sharper, clearer picture is defining a chrominance component free of luminance components, and in the alternative, a luminance component free from chrominance components. The closer the output of the separated chrominance (or luminance) component comes to the actual chrominance (or luminance) spectrum, the better the picture.

It has been discovered that passing the composite video signal through a band-pass filter (BPF) will remove most of the low frequency luminance components yielding a chrominance component having some high frequency luminance signals remaining. Further, passing the composite video signal through a comb filter will entirely eliminate most of the high frequency luminance components as well as leaving a chrominance output generally matching the actual shape of the chrominance component of the video signal. To obtain the luminance component, the chrominance is subtracted from the composite video signal.

At first glance it would appear that the ideal situation would be to always pass the composite video signal through a comb filter to achieve the chrominance component. However, it has further been realized that when there is a significant change in chrominance between pixel elements in a vertical direction, that is the chrominance changes significantly from pixel element to pixel element in a vertical line, a combed chrominance signal will result in a phenomenon called dot-crawl and will decrease the quality of the picture. In this case, passing a composite video signal through a BPF resulting in a chrominance component with high frequency luminance signals will result in a better quality picture than passing the signal through a comb filter.

Accordingly, circuits have been designed where the difference in the chrominance component in a vertical direction determines whether to use a comb filter or a BPF to obtain the chrominance component. Two types of chrominance/luminance separation circuits have been developed. The first, used in high end products and costing substantially more than the other type, is called a 2 H delay circuit since it uses three different scan lines in the separation process: no delay, one delay, and two delays. This 2 H delay circuit has an output quite close to the shape of the chrominance/luminance signal.

The second type of chrominance/luminance separation circuit is a 1 H delay circuit (for purposes of the present invention, a 1 H delay circuit is a digital delay circuit in contrast to an analog delay circuit which serves the same function) since only two scan lines are compared: a scan line having only 1 delay and the no-delay scan line. The output does not approximate the actual chrominance/luminance signal as close as the 2 H delay circuit. However, the quality of the picture using a 1 H delay circuit is considered sufficient for the cost.

For 1 H separation circuits, it is desirable to develop a comb filter that outputs a chrominance signal that more closely resembles that of the actual chrominance component.

SUMMARY OF THE INVENTION

Accordingly, the present invention provides a method of determining a chrominance element for pixel signals of an optical image for a 1 H delay circuit. The pixel signal(s) are first filtered through a band-pass filter to remove low frequency luminance components and a part of the filtered signal is fed through a 1 H scan line delay. The result is a OH pixel signal and a 1 H pixel signal one scan line apart. The OH pixel signal is added to the 1 H pixel signal to generate a combed chrominance component, and the OH pixel signal and the combed chrominance component are compared to see which is the greater. If the value of the OH pixel signal is greater or equal to the combed chrominance component, the combed chrominance component is output as the chrominance element. If the value of the OH pixel signal is less than the combed chrominance component, the OH pixel signal is output as the chrominance element.

BRIEF DESCRIPTION OF THE DRAWING

FIGS. 1A through 1D show combed chrominance outputs for a comb filter having a OH and a 1 H delay input according to the present invention.

FIG. 2 shows a first embodiment of an advanced comb filter according to the present invention.

FIGS. 3A through 3D show outputs of the advanced comb filter of FIG. 2 according to the present invention.

FIG. 4 shows a second, and preferred embodiment, of the present invention.

DETAILED DESCRIPTION OF THE INVENTION

Reference is now made to FIGS. 1A through 1D which graphically illustrate a problem with comb filters of the 1 H delay circuit type. In the scenario of FIGS. 1A through 1D, the non-delayed scan line (OH) represents the scan line having the pixel element signal (hereafter "pixel") in question and the one delay scan line (1 H) represents the scan line vertically adjacent to the pixel in question. In FIG. 1, the two scan lines, OH and 1 H, are input to a comb filter 10 which averages the two pixels and outputs a chrominance signal 12.

Referring specifically to FIG. 1A, OH and 1 H are shown input in phase to the comb filter 10. These signals, as seen, are in phase with each other. Averaging the OH and 1 H signals together in comb filter 10 will result in a zero chrominance component output.

Now referring to FIG. 1B, these input signals are 180° out of phase. Averaging these together yields a chrominance signal generally approximating the true chrominance of the original video signal.

The main problem associated with 1 H delay circuits is shown in FIGS. 1C and 1D. The OH line of FIG. 1C has no chrominance associated therewith, but the 1 H line, one scan line below, appears to have chrominance. In this case, it is safely assumed that the next line below 1 H would also contain chrominance. However, since only the OH and 1 H lines are averaged in comb filter 10 for a 1 H delay circuit, the output is half the 1 H scan line. This type of chrominance output results in cross color dot crawl and distortion of the picture. The same result occurs when OH scan line has chrominance and 1 H does not as shown in FIG. 1D. Again, the output of comb filter 10 is half the chrominance of OH with cross color dot crawl and a distorted picture.

Referring now to FIG. 2, an advanced comb filter (ACF) 20 is shown in a first embodiment of the present invention. Pixels are input at 22 and filtered in BPF 24. The filtering of BPF 24 removes low frequency luminance components. A portion of the filtered signal from BPF 24 is then output to 1 H delay 26, and a second portion of the filtered signal is output as an OH (or no delay) delay signal to node 25.

The 1 H delay 26 delays the filtered signal from BPF 24 one scan line. Therefore, a pixel output from 1 H delay 26 will be one scan line delay (1 H) from a pixel output from BPF 24 (OH). The 1 H signal is inverted by inverter 28.

The OH signal from node 25 and the 1 H signal from inverter 28 are averaged in adder 30 and element 32. The output is a pixel having a combed chrominance component, or combed pixel, which is input to a median selector 34.

Median selector 34 has two other inputs. A first is the OH pixel from node 25. A second is the OH pixel inverted by inverter 38. Inverter 38 receives the OH pixel from node 25. Therefore, median selector 34 has three inputs, all of which have already been filtered through BPF 24: a OH pixel, an inverted OH pixel, and a combed pixel.

Median selector 34 compares the three inputs and determines which has the median value. The design assumption of the present invention is that by selecting the median signal of the OH pixel, the inverted OH pixel, and the combed pixel, at least half of the halved output signals evidenced in FIGS. 1C and 1D will be eliminated. This is depicted in FIGS. 3A through 3D.

Referring first to FIG. 3A, again the signals are in-phase between the OH and the 1 H delay lines. The output yields no chrominance element in the signal. Specifically, the chrominance value of the combed pixel will be zero. On the other hand, the OH and inverted OH pixels are each BPF filtered pixels. The combed pixel will be between the OH and the inverted OH pixels, and hence the median of the three. The output of ACF 20 then is zero chrominance as shown in 3A.

In FIG. 3B, the chrominance element of the combed pixel from element 32 will align between the OH and inverted OH pixels, both of which contain chrominance elements. The output of ACF 20 is the combed pixel.

FIG. 3C shows the case where there is no color in the OH line, yet apparent color in the 1 H line. The out-put combed pixel from 32 will be half the 1 H signal. The OH and the inverted OH pixels will both be zero. Median selector 34 will assume either the OH or the inverted OH pixels as the median value and output zero as the ACF 20 output. Therefore, as a transition is made from no color to color, ACF 20 assures that there is no dot crawl and distortion by outputting no chrominance for this particular pixel location. If this location is in fact a transition from no color to color, the next delay line, 2 H, would also yield color. On the next scan pass, the 1 H line would become OH, and the 2 H would become 1 H. The inputs and output of these lines would look similar to those of 3B. Therefore, by taking the median as the ACF 20 output, a clear, distinct change is made without distortion.

Referring to 3D, chrominance is assumed in the OH line, and no chrominance exists in the 1 H line. The combed pixel output will yield half the OH pixel. This will fall somewhere between the OH and the inverted OH pixels. ACF 20 will then output the half signal as the chrominance output.

It is recognized that the output of 3D causes dot crawl and distortion in the final picture. However, dot-crawl and distortion are entirely eliminated in the 3C situation. This is approximately a 2X increase in picture clarity. Even though there is still a portion that can experience distortion, significant quality increases are realized using ACF 20 and the methods taught in the present invention.

Reference is now made to FIG. 4 where a second, and preferred, embodiment of ACF 20 is shown according to the present invention. ACF 20' in FIG. 4 is similar to ACF 20 in FIG. 2, except that the inverted OH input is eliminated and median selector 34 is replaced with selector 40 (those elements of FIG. 2 which appear in FIG. 4 are marked with a prime symbol). Therefore, only the OH pixel and the combed pixel are input into selector 40.

Selector 40 does not select a median value, but operates according to a set algorithm. Specifically, If |OH|≧|combed| then select the combed pixel.

If |OH|<|combed| then select the OH pixel.

Referring again to FIGS. 3A through 3D, in cases 3A, 3B, and 3D, the OH signal is greater than or equal to the 1 H signal and the combed pixel output is selected. In the case of 3C, the OH signal is less than the 1 H signal and the OH pixel is selected.

Again, using the ACF 20' of FIG. 4, the output of 3D causes dot crawl and distortion in the final picture. However, the distortion of 3C is eliminated and the benefits are the same as for the embodiment of FIG. 2. With the preferred embodiment of FIG. 4, less circuitry is required to achieve the same results results in less manufacturing costs.

By using the methods and devices of the present invention, a two-fold improvement in picture quality can be achieved for a 1 H delay bomb filter. Both embodiments of the present invention reduce approximately half of the dot crawl and distortion normally associated with 1 H delay comb filters.

I claim:

1. A method of determining a chrominance element for pixel signals of an optical image, a first of said pixel signals being one scan line delayed from a second of said pixel signals, the method comprising the steps of:

filtering at least the second of said pixel signals through a band pass filter (BPF) to obtain a BPF chrominance component;

adding the first of said pixel signals to the second of said pixel signals to generate a combed chrominance component;

comparing the combed chrominance component to the BPF chrominance component;

outputting as the chrominance element the combed chrominance component if the value of the BPF chrominance component is greater than or equal to the value of the combed chrominance component; and outputting as the chrominance element the BPF chrominance component if the value of the combed chrominance component is greater than the value of the BPF chrominance component.

2. A method of determining a chrominance element for pixel signals of an optical image, a first of said pixel signals being one scan line delayed from a second of said pixel signals according to claim 1, wherein the step of filtering at least the second of said pixel signals through a band pass filter (BPF) further comprises filtering the first of said pixel signals through a BPF.

3. A method of determining a chrominance element for pixel signals of an optical image, a first of said pixel signals being one scan line delayed from a second of said pixel signals according to claim 1 wherein the method further comprises the steps of:

inverting the BPF chrominance component;

comparing the value of the inverted BPF chrominance component with the value of the BPF chrominance component and the value of the combed chrominance component to determine which of the three is a median; and outputting as the chrominance element the median of the three.

4. A method of determining a chrominance element for pixel signals of an optical image, a first of said pixel signals being one scan line delayed from a second of said pixel signals according to claim 3, wherein the step of filtering at least the second of said pixel signals through a band pass filter (BPF) further comprises filtering the first of said pixel signals through a BPF.

5. A method of determining a chrominance element for pixel signals of an optical image, a first of said pixel signals being one scan line delayed from a second of said pixel signals, the method comprising the steps of:

filtering at least the second of said pixel signals through a band pass filter (BPF) to obtain a BPF chrominance component;

adding the first of said pixel signals to the second of said pixel signals to generate a combed chrominance component;

inverting the BPF chrominance component;

comparing the value of the inverted BPF chrominance component with the value of the BPF chrominance component and the value of the combed chrominance component to determine which of the three is a median; and outputting as the chrominance element the median of the three.

6. A method of determining a chrominance element for pixel signals of an optical image, a first of said pixel signals being one scan line delayed from a second of said pixel signals according to claim 5, wherein the step of filtering at least the second of said pixel signals through a band pass filter (BPF) further comprises filtering the first of said pixel signals through a BPF.

7. An apparatus for determining a chrominance element for pixel signals of an optical image comprising:

input to receive the pixel signals;

band pass filter (BPF) coupled to the input, the BPF filtering the pixel signals to obtain a BPF chrominance component signal;

1 H scan line delay coupled to the BPF to receive the BPF chrominance component signal, the 1 H scan line delay generating a 1 H delay signal;

comb filter coupled to the BPF to receive the BPF chrominance component signal, and further coupled to the 1 H scan line delay to receive the 1 H delay signal, the comb filter generating a combed chrominance component signal;

comparator coupled to the comb filter and to the BPF; and the comparator selecting, as the chrominance element, either the BPF chrominance component signal or combed chrominance component signal according to the following criteria:

if |BPF chrominance component signal |≧|combed chrominance component signal|, select combed chrominance component signal;

if |BPF chrominance component signal|<|combed chrominance component signal|, select BPF chrominance component signal.

8. An apparatus for determining a chrominance element for pixel signals of an optical image according to claim 7 wherein the apparatus further comprises:

inverter coupled to the BPF to receive the BPF chrominance component signal, the inverter inverting the BPF chrominance component signal;

the inverter further coupled to the comparator; and the comparator comparing the inverted BPF chrominance component signal with the BPF chrominance component signal and the combed chrominance component signal to determine which of the three is a median, and outputting as the chrominance element the median of the three.

9. An apparatus for determining a chrominance element for pixel signals of an optical image comprising:

input to receive the pixel signals;

band pass filter (BPF) coupled to the input, the BPF filtering the pixel signals to obtain a BPF chrominance component signal;

1 H scan line delay coupled to the BPF to receive the BPF chrominance component signal, the 1 H scan line delay generating a 1 H delay signal;

comb filter coupled to the BPF to receive the BPF chrominance component signal, and further coupled to the 1 H scan line delay to receive the 1 H delay signal, the comb filter generating a combed chrominance component signal;

inverter coupled to the BPF to receive the BPF chrominance component signal, the inverter inverting the BPF chrominance component signal;

comparator coupled to the comb filter, to the inverter, and to the BPF; and the comparator comparing the inverted BPF chrominance component signal with the BPF chrominance component signal and the combed chrominance component signal to determine which of the three is a median, and outputting as the chrominance element the median of the three.

10. A method of determining a chrominance element for a plurality of a plurality of pixel signals of an optical image, one of said pixel signals being one scan line delayed from another of said pixel signals, the method comprising the steps of:

filtering at least one of said pixel signals through a band pass filter (BPF) to obtain a BPF chrominance component;

adding the pixel signals to generate a combed chrominance component;

comparing the combed chrominance component to the BPF chrominance component;

outputting as the chrominance element the combed chrominance component if the value of the BPF chrominance component is greater than the value of the combed chrominance component; and outputting as the chrominance element the BPF chrominance component if the value of the combed chrominance component is greater than the value of the BPF chrominance component.

11. A method of determining a chrominance element for a plurality of a plurality of pixel signals of an optical image, one of said pixel signals being one scan line delayed from another of said pixel signals according to claim 10 wherein the step of filtering at least one of said pixel signals through a band pass filter (BPF) further comprises filtering the other of said pixel signals through a BPF.

12. A method of determining a chrominance element for a plurality of a plurality of pixel signals of an optical image, one of said pixel signals being one scan line delayed from another of said pixel signals according to claim 10 wherein the method further comprises the steps of:

inverting the BPF chrominance component;

comparing the value of the inverted BPF chrominance component with the value of the BPF chrominance component and the value of the combed chrominance component to determine which of the three is a median; and outputting as the chrominance element the median of the three.

13. A method of determining a chrominance element for a plurality of a plurality of pixel signals of an optical image, one of said pixel signals being one scan line delayed from another of said pixel signals according to claim 12 wherein the step of filtering at least one of said pixel signals through a band pass filter (BPF) further comprises filtering the other of said pixel signals through a BPF.

14. A method of determining a chrominance element for a plurality of a plurality of pixel signals of an optical image, one of said pixel signals being one scan line delayed from another of said pixel signals, the method comprising the steps of:

filtering at least one of said pixel signals through a band pass filter (BPF) to obtain a BPF chrominance component;

adding the pixel signals to generate a combed chrominance component;

inverting the BPF chrominance component;

comparing the value of the inverted BPF chrominance component with the value of the BPF chrominance component and the value of the combed chrominance component to determine which of the three is a median; and outputting as the chrominance element the median of the three.

15. A method of determining a chrominance element for a plurality of a plurality of pixel signals of an optical image, one of said pixel signals being one scan line delayed from another of said pixel signals according to claim 14 wherein the step of filtering at least one of said pixel signals through a band pass filter (BPF) further comprises filtering the other of said pixel signals through a BPF.

* * * * *